(12) United States Patent
Hunt

(10) Patent No.: US 7,496,242 B2
(45) Date of Patent: Feb. 24, 2009

(54) SYSTEM AND METHOD FOR IMAGE TRANSFORMATION

(75) Inventor: Neil Edmund James Hunt, Waterloo (CA)

(73) Assignee: AGFA Inc., Toronto (CA)

( * ) Notice: Subject to any disclaimer, the term of this patent is extended or adjusted under 35 U.S.C. 154(b) by 972 days.

(21) Appl. No.: 11/012,170

(22) Filed: Dec. 16, 2004

(65) Prior Publication Data

US 2006/0133693 A1  Jun. 22, 2006

(51) Int. Cl.
*G06K 9/32* (2006.01)
(52) U.S. Cl. .................. 382/293; 382/294; 382/296; 382/297; 382/298; 382/305; 345/648; 345/698; 345/427
(58) Field of Classification Search ................ 382/115, 382/276, 293, 294, 295, 296, 297, 298, 305, 382/232, 233; 358/539; 345/648, 698, 427; 348/14.13
See application file for complete search history.

(56) References Cited

U.S. PATENT DOCUMENTS

| | | | |
|---|---|---|---|
| 4,951,231 A * | 8/1990 | Dickinson et al. ........... 345/648 |
| 5,008,752 A | 4/1991 | Van Nostrand |
| 5,125,042 A | 6/1992 | Kerr et al. |
| 5,475,803 A | 12/1995 | Stearns et al. |
| 5,594,845 A * | 1/1997 | Florent et al. ................ 345/427 |
| 5,774,601 A | 6/1998 | Mahmoodi |
| 5,930,407 A | 7/1999 | Jensen |
| 6,496,609 B1 | 12/2002 | Walter |
| 2003/0122851 A1 | 7/2003 | Doyle |
| 2003/0151614 A1 | 8/2003 | Knee et al. |
| 2003/0215156 A1 | 11/2003 | Rieger |
| 2006/0104484 A1* | 5/2006 | Bolle et al. .................. 382/115 |
| 2006/0139446 A1* | 6/2006 | Kuroki et al. ............ 348/14.13 |

FOREIGN PATENT DOCUMENTS

| | | |
|---|---|---|
| EP | 0 380 459 | 8/1990 |
| EP | 0 380 459 A | 8/1990 |
| EP | 0 481 581 | 4/1992 |

(Continued)

OTHER PUBLICATIONS

PCT Search Report/Written Opinion mailed on Jan. 17, 2006.

(Continued)

*Primary Examiner*—Matthew C Bella
*Assistant Examiner*—Ali Bayat
(74) *Attorney, Agent, or Firm*—Bereskin & Parr; Isis E. Caulder

(57) ABSTRACT

An image transformation system and method for transforming a source image having source image pixel data associated with a source pixel array having an origin into a target image having target image pixel data associated with a target pixel array according to an image transformation. The image transformation is applied to the source image pixel data to generate transformed image pixel data. The transformed image pixel data is then compared to the target pixel array and the portion of the transformed image pixel data that fits within the target pixel array is determined. The portion of the source image pixel data that corresponds to the portion of the transformed image pixel data is determined. Finally, the image transformation is applied to the portion of the source image pixel data to generate the target image pixel data.

25 Claims, 12 Drawing Sheets

FOREIGN PATENT DOCUMENTS

| | | |
|---|---|---|
| EP | 0 481 581 A | 4/1992 |
| GB | 2 297 216 A | 7/1996 |

OTHER PUBLICATIONS

PCT International Perliminary Report on Patentability mailed on Jun. 19, 2007.

International Preliminary Report On Patentability, dated Jun. 19, 2007.

Blu, T. et al., "Complete Parameterization of Piecewise-Polynomial Interpolation Kernels", IEEE Transactions of Image Processing, vol. 12, No. 11, pp. 1297-1309, Nov. 2003.

Perko, R. et al., "Efficient Implementaion of Higher Order Image Interpolation", WSCG Short Commuication, Feb. 2-6, 2004, Plzen, Czech Republic.

* cited by examiner

SYSTEM AND METHOD FOR IMAGE TRANSFORMATION

FIELD OF THE INVENTION

This invention relates generally to the field of image display and more particularly to an improved system and method for transforming images for display.

BACKGROUND OF THE INVENTION

A digital image of an object is formed as an array of rows and columns of pixels, which correspond to pixels on a target pixel display such as a conventional display screen or other display device. Pixels are typically identified by their x,y coordinates in the pixel array. Each pixel has one or more associated pixel values that represent an incremental area of the object. When the image is a black and white image, the pixel value represents a gray shade of the incremental area. When the image is a color image, red, green and blue (R,G,B) pixel values are associated with each pixel. Examples of digital images include, but are not limited to, medical images such as digital x-rays and MRI images, digital film images, digital video images and satellite images.

Spatial transformations may be performed on a digital image. These kinds of transformations include scaling, rotation, translation, or other types of affine transforms. These transformation are then applied to an image or a portion of an image. When an image of an object is magnified then resampling is required to map the source image to a magnified target image since a magnified target image is represented by a greater number of pixels than the source image. Conventional transformation processing software has been developed to provide for transformation of image objects for image display. However, typically a large amount of processing resources are required to perform high-quality resampling which is conducted on a pixel-by-pixel basis. Faster resampling methods suffer from lower quality results. For example, pixel replication methods generate blocky sampling-position artifacts.

SUMMARY OF THE INVENTION

The invention provides in one aspect, an image transformation system for transforming a source image having source image pixel data associated with a source pixel array having an origin into a target image having target image pixel data associated with a target pixel array according to an image transformation, said system comprising:
  (a) a memory for storing the source image pixel data and the image transformation;
  (b) a processor coupled to said memory for retrieving the source image pixel data and the image transformation;
  (c) said processor being further adapted to:
    (i) apply the image transformation to the source image pixel data to generate transformed image pixel data;
    (ii) compare the transformed image pixel data to the target pixel array and determine the portion of the transformed image pixel data that fits within the target pixel array;
    (iii) identify the portion of the source image pixel data that corresponds to the portion of the transformed image pixel data determined in (ii); and
    (iv) apply the image transformation to the portion of the source image pixel data determined in (iii) to generate the target image pixel data.

The invention provides in another aspect, a method of transforming a source image having source image pixel data associated with a source pixel array having an origin into a target image having target image pixel data associated with a target pixel array according to an image transformation, said method comprising:
  (a) storing the source image pixel data and the image transformation;
  (b) retrieving the source image pixel data and the image transformation;
  (c) applying the image transformation to the source image pixel data to generate transformed image pixel data;
  (d) comparing the transformed image pixel data to the target pixel array and determine the portion of the transformed image pixel data that fits within the target pixel array;
  (e) identifying the portion of the source image pixel data that corresponds to the portion of the transformed image pixel data determined in (d); and
  (f) applying the image transformation to the portion of the source image pixel data determined in (e) to generate the target image pixel data.

The invention provides in another aspect, an image transformation system for transforming a source image having source image pixel data associated with a source pixel array having an origin into a target image having target image pixel data associated with a target pixel array according to an image transformation, wherein said target image contains a plurality of target columns arranged in a plurality of target rows, said system comprising:
  (a) a memory for storing the source image pixel data and the image transformation;
  (b) a processor coupled to said memory for retrieving the source image pixel data and the image transformation;
  (c) said processor being further adapted to:
    (i) apply the image transformation to the source image pixel data to generate the target image pixel data;
    (ii) resample the target image pixel data by calculating pixel values for the target image using an interpolation kernel having a set of coefficients, wherein for each target pixel within a row of the target image:
      (I) determine a target position vector and a corresponding target position within the source pixel array;
      (II) determine the corresponding source position vector within the source pixel array;
      (III) determine a remainder portion for the target position vector in respect of the source position vector; and
      (V) utilize the remainder portion from (III) to determine the set of coefficients for the interpolation kernel.

The invention provides in another aspect, a method for transforming a source image having source image pixel data associated with a source pixel array having an origin into a target image having target image pixel data associated with a target pixel array according to an image transformation, wherein said target image contains a plurality of target columns arranged in a plurality of target rows, said method comprising:
  (a) storing the source image pixel data and the image transformation;
  (b) retrieving the source image pixel data and the image transformation;
  (c) applying the image transformation to the source image pixel data to generate the target image pixel data;

(d) resampling the target image pixel data by calculating pixel values for the target image using an interpolation kernel having a set of coefficients, wherein for each target pixel within a row of the target image:
(e) determining a target position vector and a corresponding target position within the source pixel array;
(f) determining the corresponding source position vector within the source pixel array;
(g) determining a remainder portion for the target position vector in respect of the source position vector; and
(h) utilizing the remainder portion from (g) to determine the set of coefficients for the interpolation kernel.

Further aspects and advantages of the invention will appear from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show some examples of the present invention, and in which.

Figure 1:
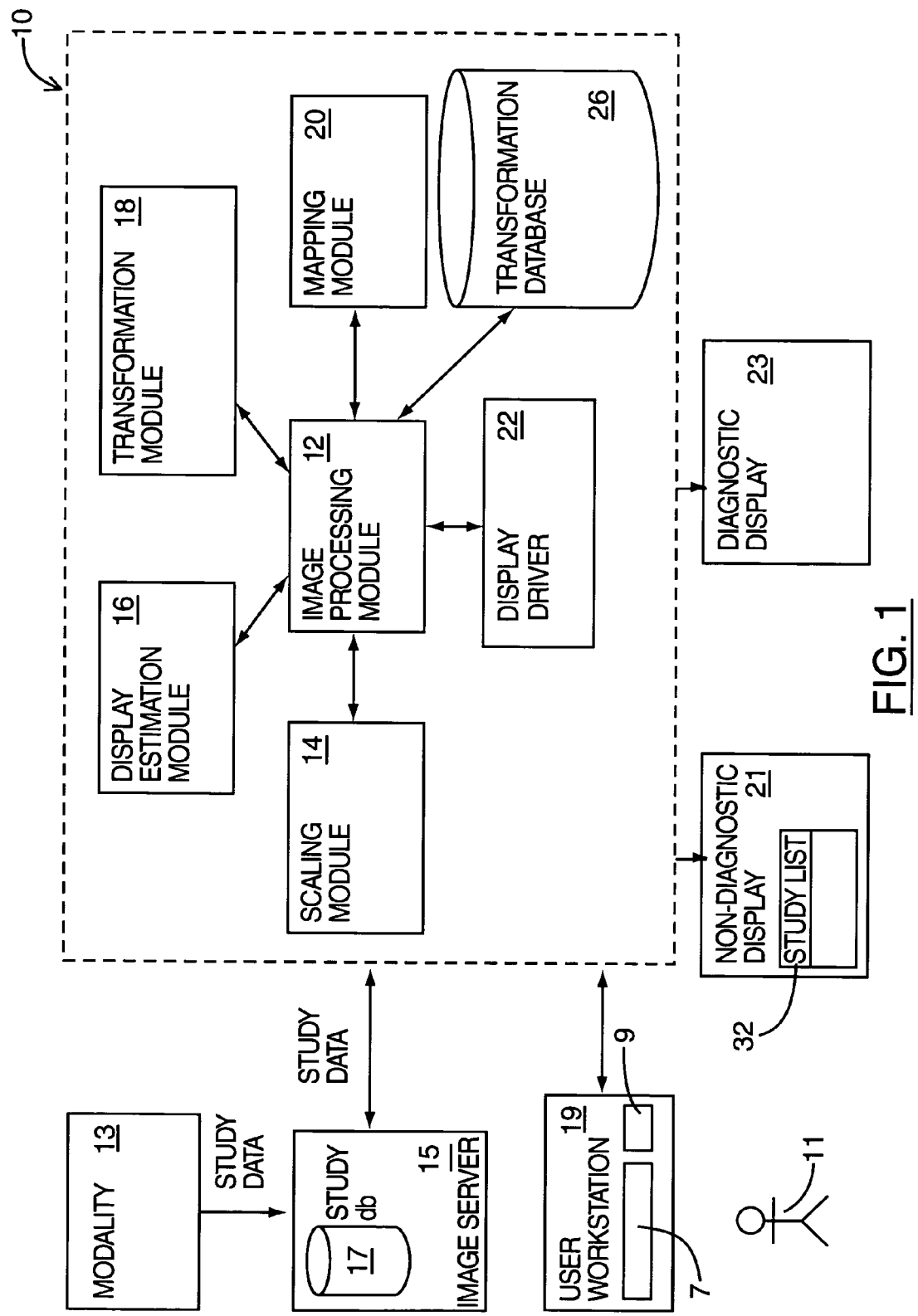
FIG. 1 is a block diagram of the image transformation system of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Figure 2:
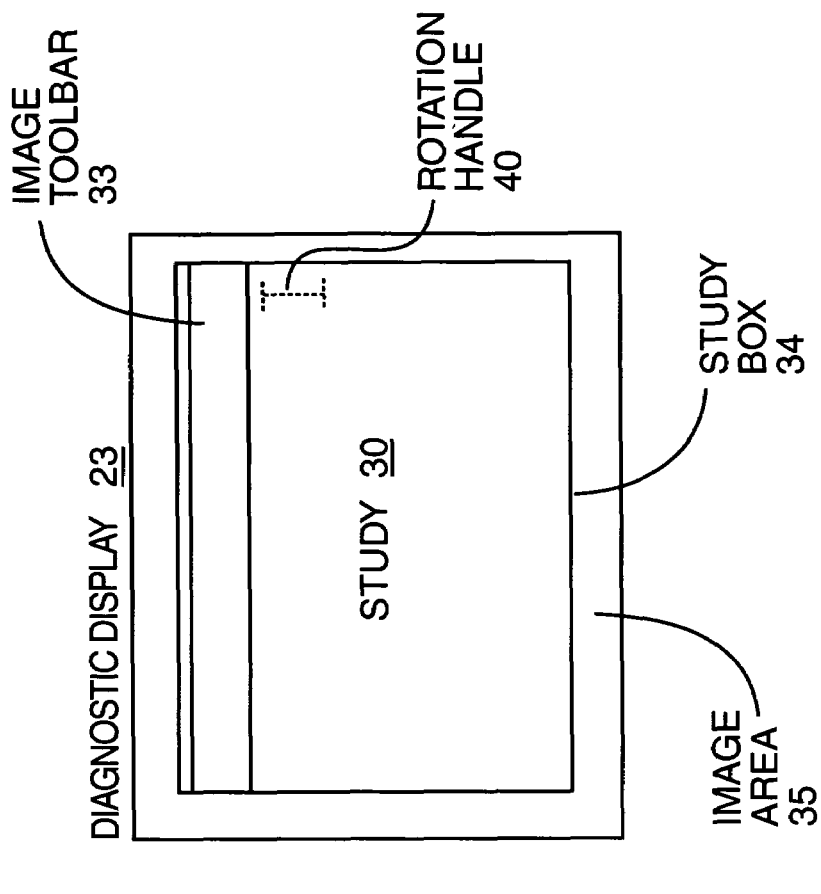
FIG. 2 is a schematic diagram of the diagnostic and non-diagnostic displays of FIG. 1.
Figure 2:
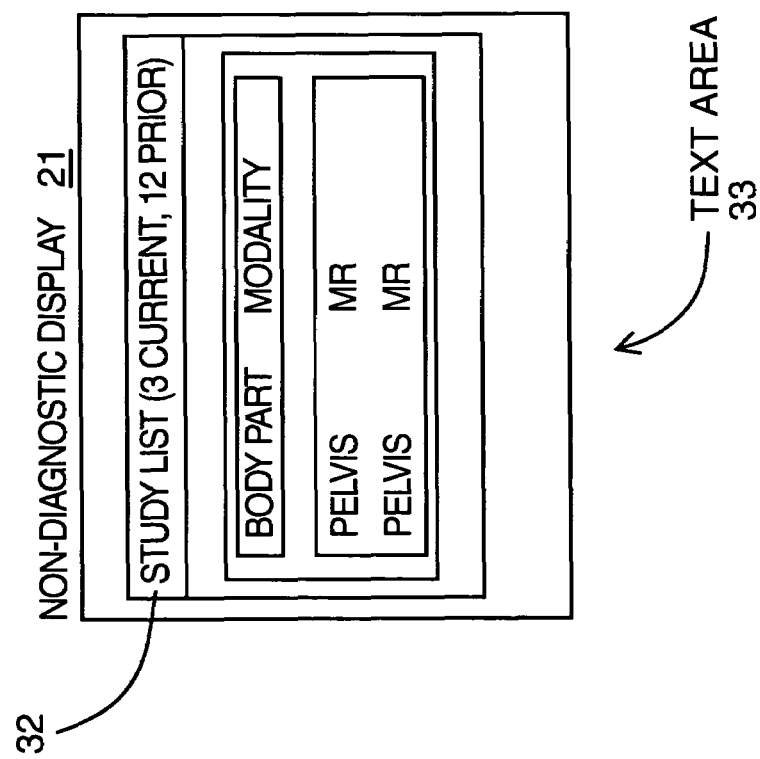

Reference is first made to FIGS. 1 and 2, which illustrate the basic elements of the image transformation system 10 made in accordance with a preferred embodiment of the present invention. Image transformation system 10 includes an image processing module 12, a scaling module 14, a display estimation module 16, a transformation module 18, a mapping module 20, a display driver module 22 and a transformation database 26. Image transformation system 10 is used to transform source image data associated with a study 30 into target image data for display on a diagnostic display 23. Image transformation system 10 accomplishes such transformation by predetermining the source image data that will be displayed on diagnostic display 23 once the image transformation is performed, and processing only that predetermined source image data in order to render the target image.

Modality 13 is any conventional image data generating device (e.g. computed radiography (CR) systems, computed tomography (CT) scanners, magnetic resonance imaging (MRI) systems, positron emission tomography (PET), ultrasound systems, etc.) utilized to generate image data that corresponds to patient medical exams. The image data generated by modality 13 is then utilized for making a diagnosis (e.g. for investigating the presence or absence of a diseased part or an injury or for ascertaining the characteristics of the diseased part or the injury). Modalities 13 may be positioned in a single location or facility, such as a medical facility, or may be remote from one another. Image data from modality 13 is stored within image database 17 within an image server 15 as conventionally known.

User workstation 19 includes a keyboard 7 and a user pointing device 9 (e.g. mouse) as shown in FIG. 1. It should be understood that user workstation 19 can be implemented by any wired or wireless personal computing device with input and display means (e.g. conventional personal computer, laptop computing device, personal digital assistant (PDA), etc.) User workstation 19 is operatively connected to non-diagnostic display 21 and diagnostic display 23. Image transformation system 10 is used to provide image display formatting depending on user inputs through user workstation 19 and user pointing device 9. Image transformation system 10 is installed either on the hard drive of user workstation 19 and/or on a central image server such that user workstation 19 works with central image server in a client-server configuration.

Non-diagnostic display 21 provides a user with a study list 32 (FIG. 2 that provides a textual format listing of studies 30 available for display. Study list 32 also includes associated identifying indicia (e.g. body part, modality, etc.) and organizes studies 30 in current and prior study categories. Typically, user 11 will review study list 32 and select a study 30 for display on diagnostic display 23. Other associated textual information (e.g. patient information, image resolution quality, date of image capture, etc.) is simultaneously displayed within study list 32 to assist the user 11 in selection of studies 30. Non-diagnostic display 21 is preferably implemented using a conventional color computer monitor (e.g. a color monitor with a resolution of 1024×768) with sufficient processing power to run a conventional operating system (e.g. Windows NT).

Diagnostic display 23 is preferably a display that provides a high-resolution image display of a study 30 to user 11 (FIG. 2). As shown in FIG. 2, a study 30 is preferably displayed within a study box 34 defined within image area 35 of diagnostic display 23. Each study box 34 has a variable dimension and is associated with a target pixel array 25 where the target image will be rendered. Diagnostic display 23 is preferably implemented using medical imaging quality display monitors with relatively high resolution typically used for viewing CT and MR image studies (e.g. black and white "reading" monitors with a resolution of 1280-1024 and up).

However, it should be understood that implementation of image transformation system 10 does not necessarily require the presence of a physical screen display device such as diagnostic display 23. While the present description will refer to display of the target image data generated by image transformation system 10 on diagnostic display 23 for illustrative purpose, it should be understood that the target image data could instead be utilized in various ways. For example, the target image data could be displayed within a cell on a printed page output or displayed within an image area for export to another image processing system.

Image processing module 12 coordinates the activities of scaling module 14, display estimation module 16, transformation module 18, and mapping module 20 in response to user commands sent by user 11 from user workstation 19 and manages data within the transformation database 26. Image processing module 12 is adapted to receive a request from user workstation 19 that indicates that the user 11 wishes to transform the study 30 in some way (e.g. by scaling, warping, rotation, translation, etc. or a combination thereof within study box 34 on diagnostic display 23. As noted above, study 30 is associated with certain original source image data, stored within study database 17 on image server 15. Image processing module 12 will then instruct and coordinate, as appropriate, scaling module 14 and/or transformation module 18 to perform the requested scaling and/or transformation on the original source image data. Then image processing module 12 instructs display estimation module 16 to predetermine the specific data from the original source image that will fall within the target pixel array 25 once the selected image scaling and/or transformation has been performed. Finally, image processing module 12 will use the mapping module 20 to process only that predetermined original source image data in order to render the target image within target pixel array 25.

Scaling module 14 is used to scale the original source image associated with study 30 to generate a scaled source image. The initial warping (i.e. scaling transformation) of the source image generates (at least in part) the target image and allows display estimation module 16 to determine the graphical boundaries of the target image on target pixel array 25 and process only that portion of the original source image which, when scaled, will fit onto target pixel array 25. The scaled source image is then mapped onto the target pixel array 25 by the mapping module 20 as will be explained below.

Transformation module 18 transforms the original source image associated with study 30 to generate a transformed source image. The initial transformation of the source image generates (at least in part) the target image and allows display estimation module 16 to determine boundaries of the target image on target pixel array 25 and process only that portion of the original source image which, when transformed, will fit onto the target pixel array 25. The transformed source image is later mapped onto target pixel array 25 by the mapping module 20 as explained below.

For purposes of explanation, scaling module 14 and transformation module 18 will be discussed in respect of the scaling and rotation of an original source image. However, it should be understood that image transformation system 10 can be used to perform any affine transformation on an original source image (e.g. rotation, warping, translation, etc. or any combination thereof). As is conventionally known, affine transformations are defined as being any linear matrix transformation of one coordinate system to another. The specific properties associated with an affine transform include: (i) parallel lines remain parallel, (ii) lines remain straight when transformed, and (iii) dimensions along a line may change when transformed, a particular distance will transform the same amount no matter where along a particular line the distance range is placed. These transformation properties are utilized within image transformation system 10.

Display estimation module 16 compares the target pixel array 25 to the scaled/transformed source image to estimate the size and dimensions of the target image (i.e. the portion of the scaled/transformed source image that falls within the target pixel array 25). There are various ways that the scaled/transformed source image can be positioned within target pixel array 25 (i.e. which part is overlain) depending on the objectives and operational parameters of the overall imaging system. A default procedure for overlaying the scaled/transformed source image onto the target pixel array 25 could be utilized. For example, the procedure could implement the rule that the far left of the resulting scaled/transformed source image is always be placed in the bottom left corner of the target pixel array 25. Alternatively, an overlaying procedure could be specifically selected by the user according to the user's preferences or by a particular imaging application according to the application's requirements.

Once the size and boundaries of the target image are ascertained, it is possible to determine the portions of the original source image that correspond to the target image, that is, the portions of the original source image that when scaled/transformed fall within the target pixel array 25 can be calculated simply by performing a negative translation (e.g. negative rotation and inverse scaling operation as required). These portions of the original source image are then used for re-sampling by the mapping module 20 as will be described. Display estimation module 16 identifies the start position of each target row within the target image in the original source image coordinate space. In addition, display estimation module 16 calculates a fixed point vector in the original source image coordinate space that represents a one column displacement along the rows of the target pixel array 25. The use of fixed point vectors allows for greater processing efficiency as will be explained below.

Mapping module 20 performs interpolation to determine the pixel values for the pixels of the target image to be displayed within target pixel array 25. The scaled/transformed source image does not in general map perfectly onto the target pixel array 25. Therefore, some sort of re-sampling is required. One manner in which this is accomplished is by performing interpolation as will be described. Interpolation can be accomplished using several approaches including but not limited to bilinear, nearest neighbor, and bicubic interpolation methods. For illustrative purposes, mapping module 20 will be described as utilizing bilinear interpolation to re-sample the scaled and transformed source image. Accordingly, mapping module 20 will utilize the remainders of the fixed point vectors calculated by display estimation module 16 as bilinear interpolation coefficients as will be explained below. The use of these remainders allows for computational efficiency since it becomes unnecessary to perform additional calculations to determine the values of the coefficients.

Figure 3:
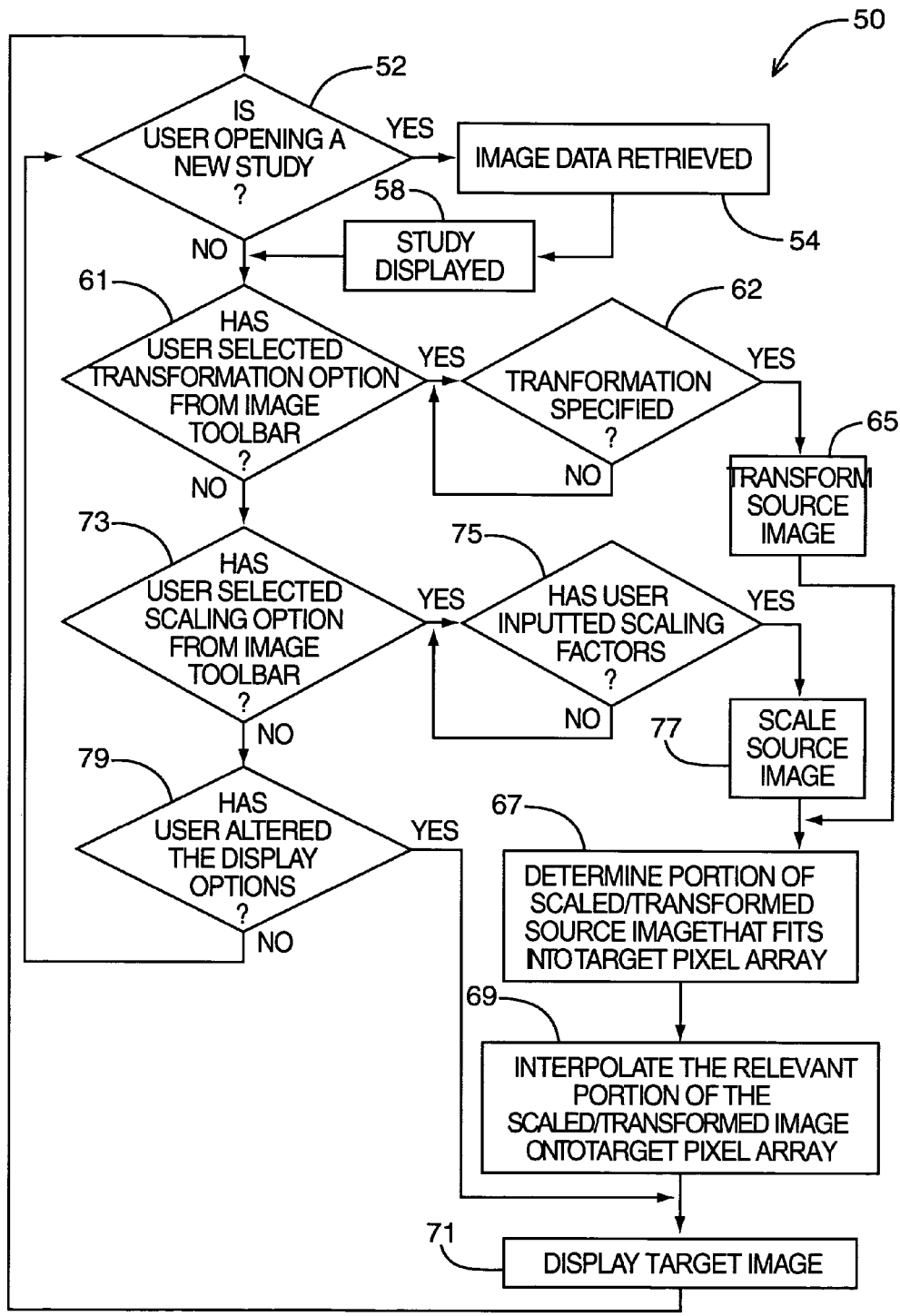
FIG. 3 is a flowchart illustrating the process steps conducted by the image transformation system of FIG. 1.

Referring now to FIGS. 1, 2 and 3, the basic operation of image transformation system 10 is illustrated. Specifically, FIG. 3 illustrates the basic operational steps of image transformation system 10.

At step (52), it is determined whether user 11 is requesting the display of a new study 30 using keyboard 7 and/or mouse 9 of user workstation 19 (e.g. by clicking on desired studies 30 listed in study list 32 on non-diagnostic display 21). A user can open a new study 30 in a number of ways. First, user 11 can select a study 30 from a study list 32 on non-diagnostic display and drag it to a particular location on diagnostic display 23. Second, user 11 can select the study 30 directly from study list 32 (e.g. by double clicking on the textual representation of study 30). It should be understood that these are only two exemplary methods of opening a new study 30 and that many other methods could be utilized and recognized by image processing module 12.

If the user has requested display of a new study 30, then at step (54), image processing module 12 requests the image data associated with the requested new study 30 from study server 15. Image server identifies the requested image data and retrieves it from image database 17. At step (58), the study 30 is displayed.

At step (61), it is determined whether the user 11 has selected an image transformation (e.g. rotation) option from the image toolbar 36. In the case of a rotation transformation the user 11 would select the rotation handle 40. If the user has selected an image transformation option then at step (62), it is determined whether the user is selecting a particular transformation (e.g. dragging the rotation handle). If not then image transformation system 10 continues to monitor whether the user is selecting a particular transformation (e.g. dragging the rotation handle). If user 11 is doing so, then image transformation system 10 transforms the original source image associated with study 30 at step (65) and proceeds to step (67). If not, then image transformation module continues to monitor whether user 11 is selecting a particular transformation.

At step (67), display estimation module 16 determines the portion of scaled/transformed study 30 that fits onto the target pixel array 25 to determine the dimension and the content of the target image. This information is then utilized by display estimate module 16 to predict which portions of the original source image that correspond to the target image, that is, the portions of the original source image that when scaled/transformed fall within the target pixel array 25.

As discussed, above the pixel positions of the scaled/transformed image are likely not to correspond exactly to the pixel positions of the target pixel array 25. Accordingly, at step (69), mapping module 20 effectively maps the portion of the scaled/transformed study image determined above onto the pixels of target pixel array 25 using interpolation techniques as will be described. Specifically, mapping module 20 uses interpolation techniques to estimate the pixel values for the target image within target pixel array 25. At step (71), the scaled/transformed source image is redisplayed in its transformed (i.e. rotated and/or scaled, etc.) format as a target image within target pixel array 25.

If at step (61), the user had not selected a transformation option then image transformation system 10 continues on to step (73). At step (73) it is determined whether user 11 has selected the scaling option from image toolbar 36. If user 11 has selected the scaling option then at step (75) it is determined whether user 11 has inputted a scaling factor. If not then image transformation system 10 continues to monitor whether user 11 has inputted a scaling factor. If user 11 has inputted a scaling factor then at step (77) scaling module 14 scales study 30. Then steps (67) through (71) are preformed as described above. If however, at step (73) it is determined that the user has not selected the scaling option from the image toolbar, then display estimation module moves on to step (79). At step (79), it is determined whether the user has altered any of the display options. If not then step (52) is executed again. If so then step (71) is executed.

The basic operation of image transformation system 10 discussed above can be adapted to support a particular process of scaling and transformation as required by a particular image application. For example, image transformation system 10 can be used to first scale the original source image then transform (e.g. rotate) the scaled original source image, and then scale the resulting image. Finally, a portion of the final image is selected to map into target pixel array 25. The pre-transform or post-transform scaling discussed above can be unity (i.e. no operation) or non-unity as desired. For instance, image data that is sub-sampled in one dimension can be transformed (e.g. rotated) by undoing the sub-sampling using pre-transformation scaling. If a sub-sampled result is desired, then sub-sampling can be accomplished during post-rotate scaling. Also, each scaling step can be used to either magnify or minify the image data. As discussed before, image transformation system 10 can be used to support any affine transformation of image data, although the best quality results are obtained using angle-preserving transforms.

Figure 4:
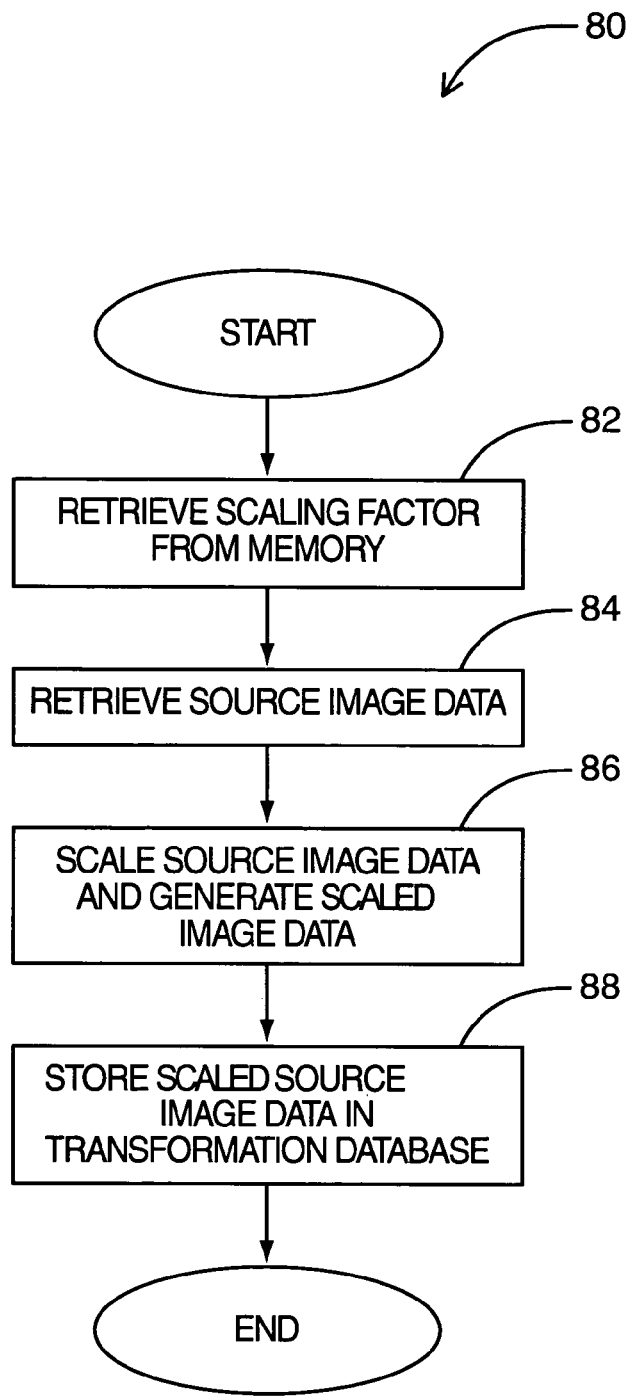
FIG. 4 is a flowchart illustrating the process steps conducted by the scaling module of FIG. 1.

Now referring to FIGS. 1, 2, 3, and 4, the specific workings of the scaling module 14 will be described. Specifically, FIG. 4 illustrates the basic operational steps of scaling module 14.

If user 11 has inputted scaling instructions then image processing module 12 sends instructions to scaling module 14 at step (77) of FIG. 3. At step (82) of FIG. 4, scaling module 14 receives the scaling factor from the image processing module 12. At step (84), scaling module 14 retrieves source image data associated with study 30 from transformation database 26. At step (86), the source image data is scaled according to the parameters inputted by the user 11. Then the scaled source image data is stored in transformation database 26 at step (88).

Figure 5:
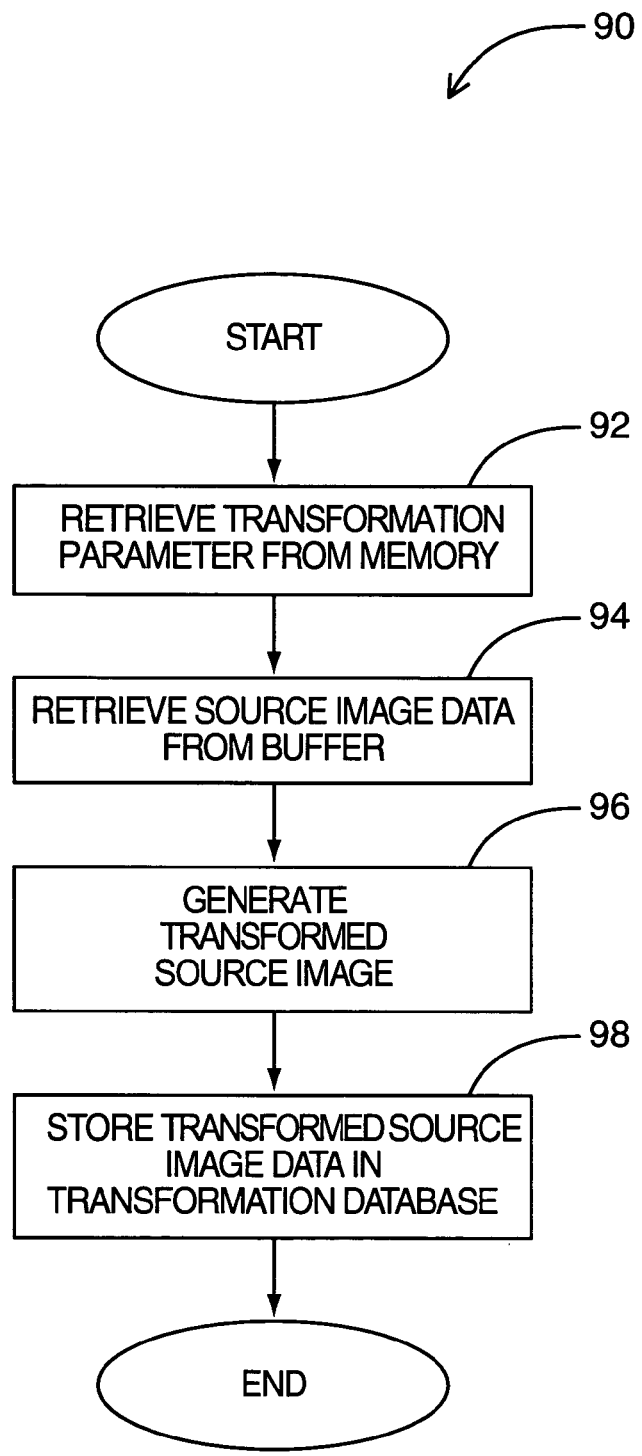
FIG. 5 is a flowchart illustrating the process steps conducted by the transformation module of FIG. 1.

Now referring to FIGS. 1, 2, 3, and 5, the specific workings of the transformation module 18 will be described. Specifically, FIG. 5 illustrates the basic operational steps of transformation module 18. As noted, above, while the following exemplary discussion will describe transformation module 18 as being adapted to provide rotation transformations to source image data, it should be understood that transformation module 18 could be adapted to provide a variety of geometrical transformations to source image data.

If user 11 has dragged rotation handle 40, image processing module 12 sends instructions to transformation module 18 at step (77). At step (92) of FIG. 6, transformation module 18 receives the rotation angle from the image processing module 12. At step (94) transformation module 18 retrieves source image data associated with study 30 from transformation database 26. At step (96) the source image associated with study 30 is rotated according to the parameters inputted by the user 11. Then the transformed source image is stored in transformation database 26 at step (98).

Figure 6:
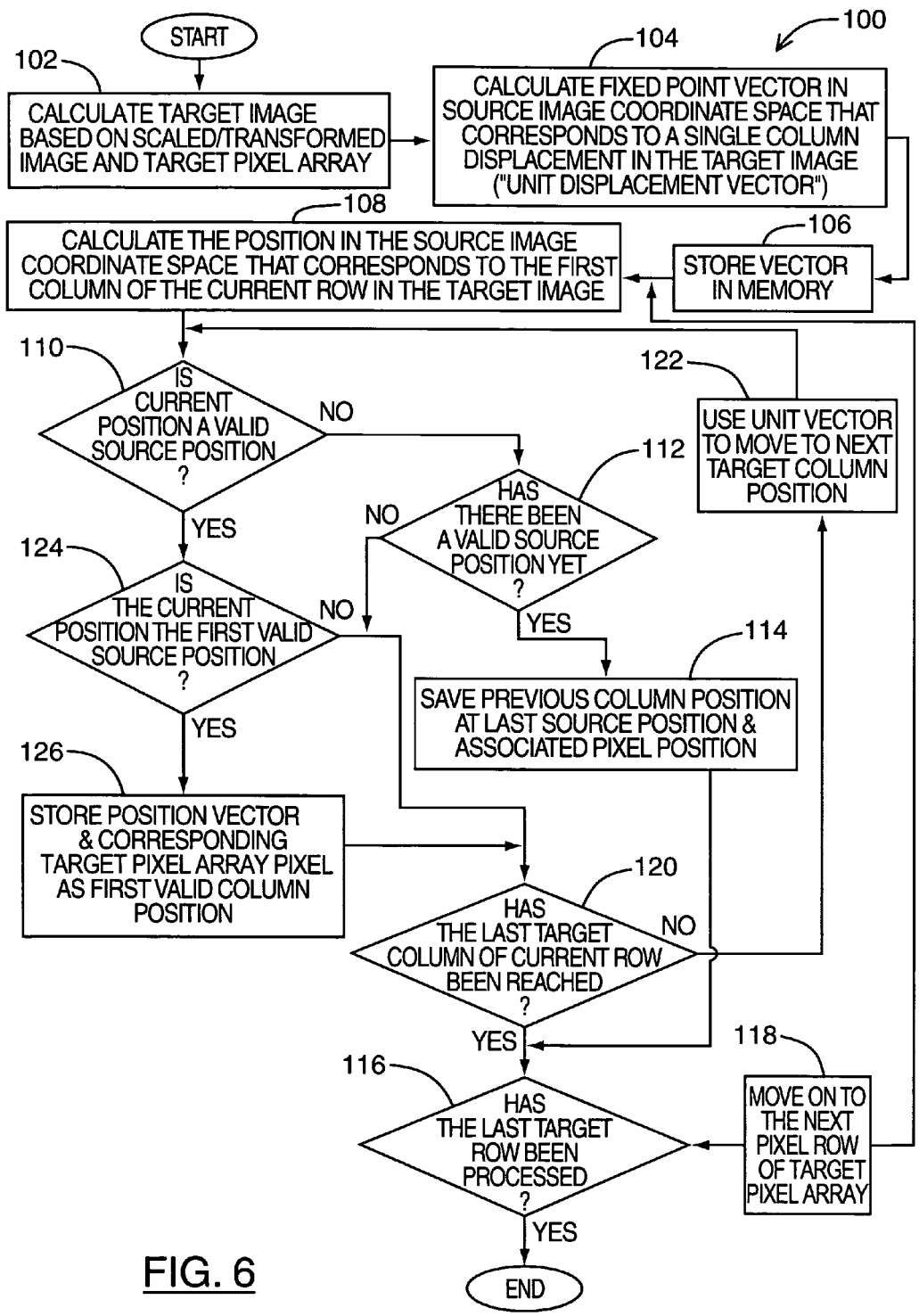
FIG. 6 is a flowchart illustrating the process steps conducted by the display estimation module of FIG. 1.

Now referring to FIGS. 1, 2, 3, and 6, the specific workings of the display estimation module 16 will be described. Specifically, FIG. 6 illustrates the operational steps executed by display estimation module 16. As discussed, above, at step (102) display estimation module 16 first compares the scaled/transformed source image to the target pixel array 25 to estimate the size and boundaries of the target image (i.e. the portion of the scaled/transformed source image that falls within the target pixel array 25). Once the size and boundaries of the target image are ascertained, it is possible to determine the portion of the original source image that correspond to the target image. That is, the portion of the original source image that when scaled/transformed fall within the target pixel array 25.

At step (104), display estimation module 16 calculates the unit displacement vector in the coordinate space of the original source image that corresponds to a single column displacement within the target image. The unit displacement vector is preferably a fixed-point vector. A fixed-point vector has fractional accuracy and contains an integer portion and a fractional portion. The decimal portion of the fixed point vectors can be easily added and subtracted without any round-off error. The only limitation on precision is determined by the number of bits used for the fractional portion. Therefore, integer arithmetic can be used when calculating fractional accuracy of the position.

At step (106), the calculated fixed-point vector that corresponds to a single column displacement is stored in transformation database 26.

At step (108), display estimation module 16 determines the position within the original source image coordinate space that corresponds to the first column of the current row of target pixels within target image. Fixed point vectors are also used at this stage to measure the "increment" or "change in position" on the original source image for each pixel within a target row of the target image as will be described.

Each fixed point vector is two-dimensional, meaning it has an x-component, and a y-component. The fixed-point position is the position, with fractional (sub-pixel) accuracy, of the original source image pixel that maps to a target pixel within the target image. As a target row of the target image is traversed, the fixed-point position within the original source image will be exactly predictable. The fixed-point position is required to ensure that there is no deviation from the valid range of target image columns that have been determined from the comparison of the scaled/transformed image data with the target pixel array 25. Otherwise, it would be possible to exceed the source image when calculating a target pixel.

At step (110) it is determined whether the current target pixel position corresponds to a valid source position within the original source image coordinate space. A valid source position is defined as a position within the original source image coordinate space, for which the associated interpolation kernel will only include pixels within the source image. Specifically, in the case of bilinear interpolation where a 2×2 interpolation kernel is utilized, a position within the source image is associated with four source image pixels positioned around it. If these four source image pixels are within the source image than that position is a valid source position.

Figure 7:
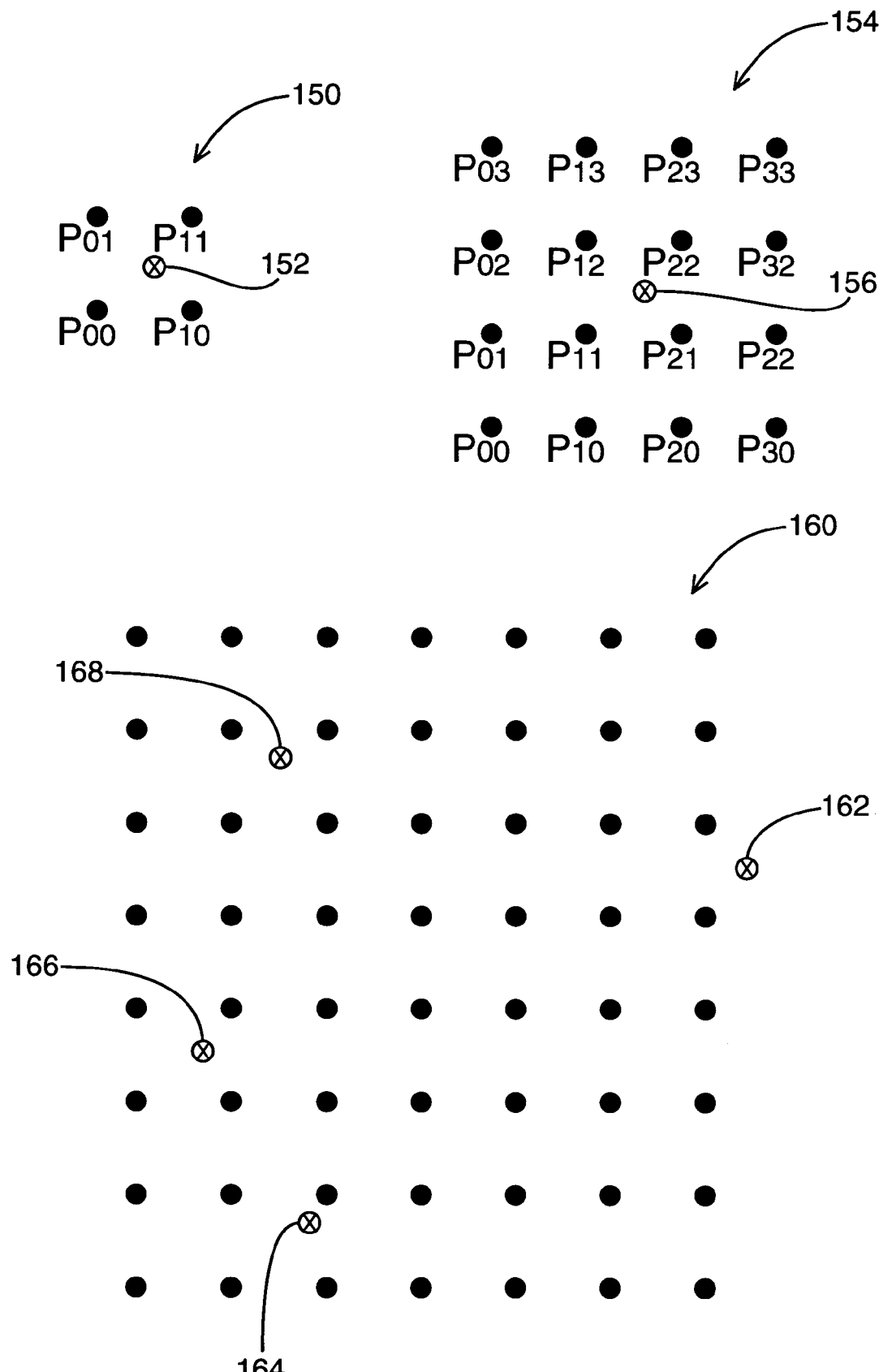
FIG. 7 is a diagram illustrating valid and invalid positions on the source image for purposes of bilinear and bicubic interpolation.

Reference is now made to FIG. 7, which illustrates a set of pixels 150 that would be used by a bilinear interpolation kernel for the source image position 152. Also illustrated is a set of pixels 154 that would be used by a bicubic interpolation kernel for the source image position 156. FIG. 7 also illustrates several valid and invalid source positions. For the set of source image pixels 160, position 162 is an invalid source position for both bilinear and bicubic interpolation. Positions 164 and 166 are valid for bilinear and invalid for bicubic. Position 168 is valid for both bilinear and bicubic interpolation.

It should be noted that positions 164 and 166 (which correspond to the edge of the image) can still be calculated for bicubic interpolation by treating the edge case separately. By replicating the image edge pixels beyond their original boundaries (the source data would not actually be replicated), it is possible to calculate the edge pixels. However, this would be conducted as a "separate" calculation and would require additional processing apart from the main image transformation process described.

Referring back to FIGS. 1, 2, 3, and 6, if it is determined that the current position is not a valid source position then display estimation module 16 moves on to step (112). At step (112), it is determined whether a valid position within the original source image coordinate space has been found for the current target row being traversed within the target image. If so, then at step (114), the previous target column position is stored as the last valid source position. Given that original source images are generally rectangular and that the transformations being considered are affine, the set of valid source pixels in a current target row within the target image are typically contiguous. Thus, once an invalid source position is found after a valid source position, all the following target pixels along the row within the target pixel array 25 must correspond to invalid source positions.

At step (116) it is determined whether the last target row within the target image has been processed. If so, then the process is terminated. If not, then at step (118), display estimation module 16 moves onto the next target row within target image and then step (108) and the steps following it are repeated.

If however, at step (112) it is determined that a valid source position has not yet been processed in the current target row, then step (120) is executed. At step (120), it is determined whether the last column of the current row of target image has been reached. If so, then step (116) is executed as explained above. If not, then at step (122) the unit displacement vector is utilized to move to the position on the source image that corresponds to the target pixel in the adjacent column of target image.

Returning to step (110), if it is determined that the current position is a valid source position, then step (124) is executed. At step (124) it is determined whether the current position is the first valid source position of the current row within target image If so, then at step (126), the position vector of the current position is calculated and stored as the first valid column position vector. Then step (120) is executed as explained above. Returning to step (124). If it is determined that the current position is not the first valid source position then step (120) is executed as explained above.

Accordingly, display estimation module 16 determines the portions of the original source image that correspond to the target image, that is, the portions of the original source image that when scaled/transformed fall within the target pixel array 25. Specifically, display estimate module 16 determines the range of columns within each target row of the target image that correspond to a valid source position. The range of columns within each target row of target image is defined by the first and final valid column position vectors as determined above.

It should be understood that while the above-noted discussion has specifically discussed "row-wise" processing within the target image, image transformation system 10 could also operate in a "column-wise" manner. That is, display estimation module 16 could instead identify the start position of each target column within the target image in the original source image coordinate space and calculate a fixed point vector in the original source image coordinate space that represents a one row displacement along the rows of the target pixel array 25. Display estimation module 16 could then determine the range of rows within each target column of the target image that correspond to a valid source position. The range of rows within each target column of target image would then be defined by first and final valid row position vectors.

Figure 8:
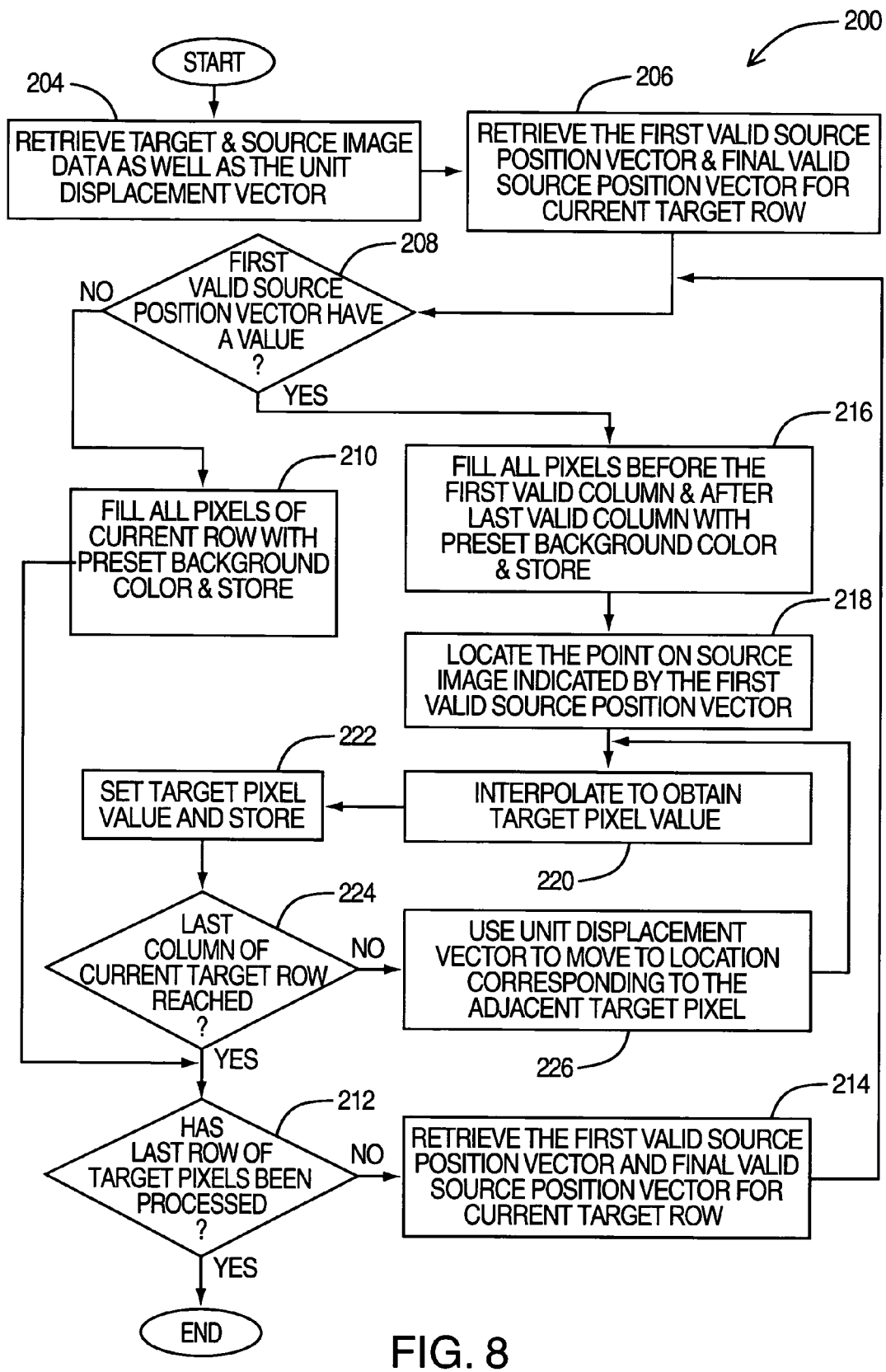
FIG. 8 is a flowchart illustrating the process steps conducted by the mapping module of FIG. 1.

Now referring to FIGS. 1, 2, 3, 8 and 9, the specific workings of the mapping module 20 will be described. FIG. 8 illustrates in a flow chart the basic operational steps executed by the mapping module 20. Mapping module 20 performs interpolation to determine the specific pixel values for the target image to be displayed within target pixel array 25. The scaled and transformed source image does not in general map perfectly onto the target pixel array 25. Therefore, re-sampling is required to determine the specific pixel values for the pixels of the target image to be displayed within target pixel array 25. Re-sampling is accomplished by performing interpolation as will be described.

Figure 9:
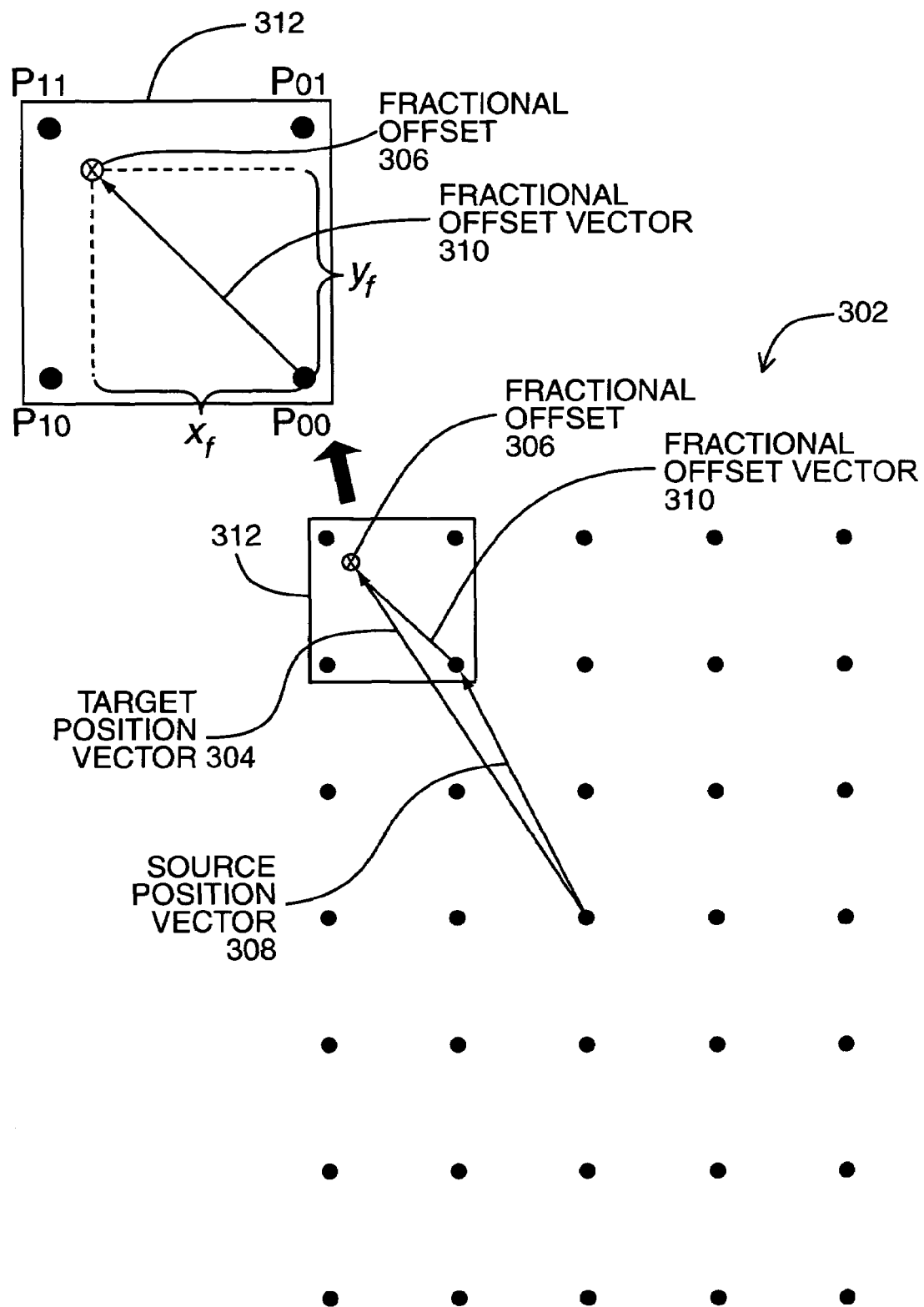
FIG. 9 is a diagram illustrating an array of source pixels as well as the offset remainder vector used by mapping module of FIG. 1 to calculate coefficients for bilinear interpolation.

FIG. 9 illustrates a source pixel array 302 associated with the original source image. The origin is assumed to be at the center of the source pixel array 302 for ease of illustration. The target position vector 304 indicates the position of a target pixel within a current row of a target image in the original source image coordinate space. The actual point corresponding to the target position vector 304 is shown at 306. The source position vector 308 indicates the position of the source pixel that corresponds to the target pixel. The fractional offset vector 310 is the remainder portion of the target position vector for the current target pixel. The point 306 corresponding to the target position vector may also be identified by the source position vector 308 and fractional offset vector 310. The source position vector 308 represents the position of a source pixel and the target position vector 304 is calculated according to the specific scaling and transformation operations performed by scaling module 14 and transformation module 18 on original source image.

At step (204), original source and target image data as well as the unit displacement vector are retrieved from transformation database 26. At step (206), the first valid source position vector and the final valid source position vector for the current target row are retrieved from transformation database 26. At step (208), it is determined whether the first valid source position vector retrieved in step (206) has been given a value by the display estimation module 16. If not, then no valid source positions were found by the display estimation module 16 for that target row within the target image. Therefore, at step (210) all the pixels of the current target row are set to a preset background color. This preset color is preferably chosen such that it would be obvious that the relevant pixels of the target pixel array 25 do not form part of study 30. For example, the preset color could be black.

At step (212) it is determined whether the last target row has been processed. If not, then at step (214), mapping module 20 retrieves the first valid source position vector and the final valid source position vector for the next target row and step (208) and those that follow it are repeated. If however, it is determined that the last target row has been processed then the mapping module 20 terminates its activity.

Returning to step (208), if it is determined that the first valid source position vector retrieved (i.e. either from step (206) or step (214)) has been assigned a value then it is the case that there is at least one valid source image position corresponding to pixels in that target row. Therefore, at step (216) all the target pixels that precede the first valid target column and those that are positioned after the last valid target column within the current target row of the target image are set to the preset background color discussed above. If the first valid source position for the current target row of the target image has an assigned value and the final valid source position vector does not have an assigned value, then the final pixel of the current target row must correspond to a valid source image. Accordingly, there is no need to assign pixel values to any target pixels beyond the final valid source position.

At step (218), the point on the original source image indicated by the first valid source position vector is located. At step (220), mapping module 20 obtains a corresponding pixel value for the target pixel on target pixel array 25 using interpolation as follows.

Now referring to FIGS. 9, 10A and 10B, the preferred interpolation method of mapping module 20 will be described. As shown in FIG. 9, quadrilateral 312 encloses the four original source pixels that are utilized by a bilinear kernel for target pixel 306. An enlarged view of the pixel area defined by quadrilateral 312 is also shown indicating the fractional vector $(x_f, y_f)$ 310.

Figure 10A:
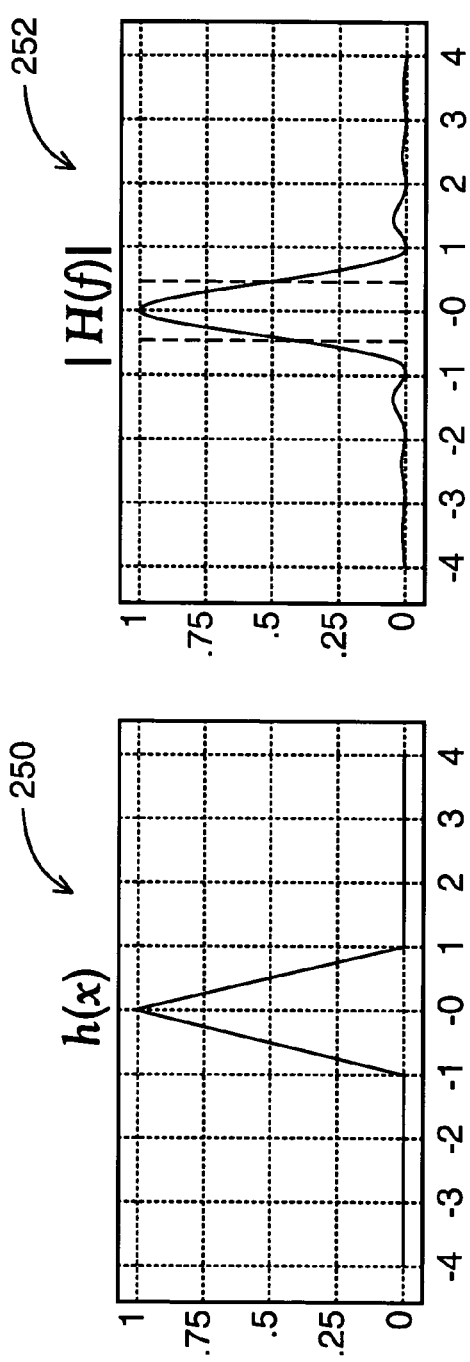
FIG. 10A is a diagram illustrating a one-dimensional linear interpolation kernel and its Fourier transform.
Figure 10B:
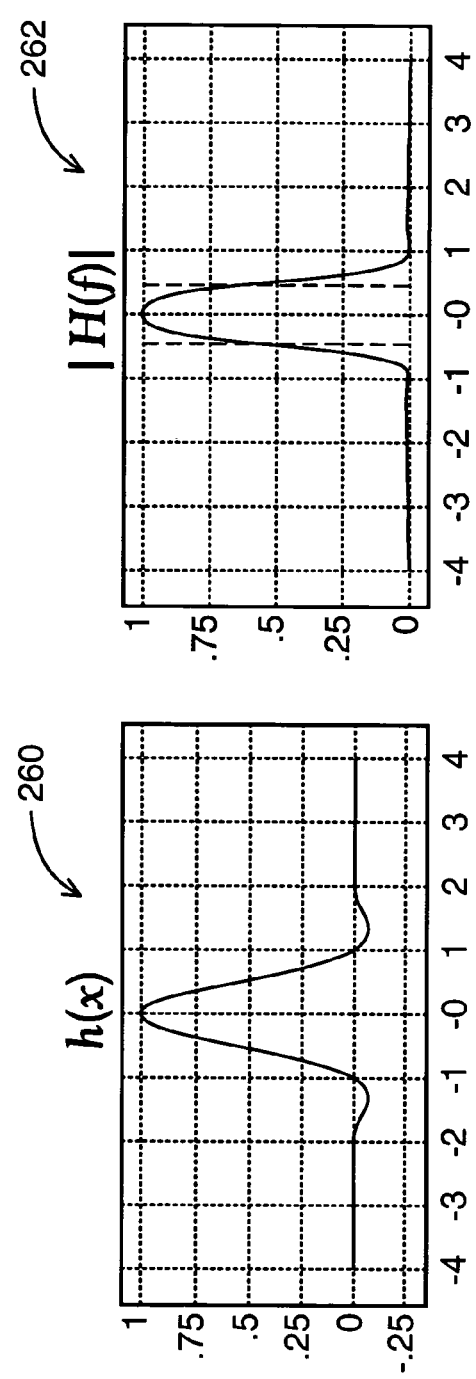
FIG. 10B is a diagram of a one dimensional cubic interpolation kernel and its Fourier transform.

FIG. 10A illustrates a one-dimensional linear interpolation kernel 250 and its Fourier transform 252. The equation for the one-dimensional linear kernel is given below:

$$h(x) = \begin{cases} 1 - |x| \ldots 0 \leq |x| < 1 \\ 0 \ldots 1 \leq |x| \end{cases}$$

While various interpolation methods may be used by mapping module 20 to calculate target pixel values for display within target pixel array 25, it is preferred for mapping module 20 to utilize bilinear interpolation. This is because when the source position vector for each target pixel is calculated, the remainder portion of the fixed point target position can be used to calculate the bilinear interpolation coefficients. This is possible since the remainder portion of the fixed target position represents the offset from one of the four closest source pixels in the coordinate space of the original source image. Specifically, of the four closest source pixels it is the one that is closest to the origin in the coordinate space of the original source image.

If the fractional vector is given by the $(x_f, y_f)$ and the pixel values of the surrounding source pixels are represented by $P_{00}$, $P_{01}$, $P_{10}$, and $P_{11}$ then the pixel value of the target pixel is given by the following formula:

$$P_t = (1-x_f)(1-y_f)P_{00} + x_f(1-y_f)P_{01} + (1-x_f)y_F P_{10} + (x_f)(y_f)P_{11}$$

The above equation may be grouped as follows:

$$P_t = (1-y_f)[(1-x_f)P_{00} + x_f P_{01}] + (y_f)[(1-x_f)P_{10} + (x_f)P_{11}]$$

This indicates that successive source pixels in each source row may be weighed and added followed by the intermediate row results. The grouping could also be done along source columns. The method chosen can be adapted to the order in which data has been loaded into memory, thereby maximizing efficiency.

The interpolation step (220) of FIG. 8 could instead utilize another interpolation method such as bicubic interpolation. FIG. 10B illustrates a one-dimensional cubic kernel 260 as well as its Fourier transform 262 for a=−0.5. The equation for the one dimensional cubic kernel given below:

$$h(x) = \begin{cases} (a+2)|x|^3 - (a+3)|x|^2 + 1 \ldots 0 \leq |x| < 1 \\ a|x|^3 - 5a|x|^2 + 8a|x| - 4a \ldots 1 \leq |x| < 2 \\ 0 \ldots 2 \leq |x| \end{cases}$$

While the value a=−0.5 has been found to be useful in practice, any number from 0 to −1 can be used. It should also be understood that bicubic kernels can have other formulas than the one presented above.

In the case of bicubic interpolation, it would be preferred for a lookup table of coefficients to be precalculated (e.g. at the beginning of the program). If this is done then the offset coefficients mentioned above in respect of the bilinear method may be used as arguments for the lookup table. In such a situation the two nearest source pixels, on either side, in both directions, are utilized. The formula for $P_t$ becomes $$P_t = K_0[y_f](K_0[x_f]P_{00} + K_1[x_f]P_{01} + K_2[x_f]P_{02} + K_3[x_f]P_{03}) + K_1[y_f](K_0[x_f]P_{10} + K_1[x_f]P_{11} + K_2[x_f]P_{12} + K_3$$

$$[x_f]P_{13})+K_2[y_f](K_0[x_f]P_{20}+K_1[x_f]P_{21}+$$
$$K_2[x_f]P_{22}+K_3[x_f]P_{23})+K_3[y_f](K_0[x_f]$$
$$P_{30}+K_1[x_f]P_{31}+K_2[x_f]P_{32}+K_3[x_f]P_{33});$$

where the $K_n[\,]$ are the look up table values, the subscript n in $K_n$ represents the index of each of the four nearest neighbor source pixel positions (i.e. the two nearest source pixels on either side in both directions), and $P_{mn}$ are the pixel values of the surrounding source pixels. It should be understood that the coefficients $K_n[x_f]$ need only be determined once and then can be reused four times due to the symmetry of the formula. Finally, it should be understood that various bicubic kernels may be used to generate the lookup table.

Image transformation system 10, whether it is performing bilinear or bicubic interpolation is well suited for implementation with MMX™ technology (manufactured by Intel Corporation of California, U.S.A.) This is a direct consequence of the fact that MMX, depending on the operation, may operate on two or four pixels simultaneously. Since each target pixel uses four source pixels, bilinear interpolation is well suited to MMX technology, which allows four 16-bit integers to be operated on by one operand. Given that some of the coefficients for multiplication are reused, they can be loaded into the MMX registers once and utilized twice for bilinear interpolation or four times for bicubic. It should be understood that image transformation system 10 is equally capable of magnification and minification and that any affine transformation can be accommodated.

However, bilinear interpolation does not provide a perfect sampling filter and produces staircase artifacts within the output image. In contrast, bicubic interpolation allows for larger kernel approximations that result in better re-sampling filtering and no visible staircasing artifacts. However, bicubic interpolation can result in "overshooting" a particular pixel range while bilinear interpolation does not have this issue. Also, bicubic interpolation can be more than two to four times slower than bilinear interpolation since four times the number of source pixels are utilized (i.e. two times as many pixels in each direction). As discussed above, various interpolation methods can be utilized within image transformation system 10. While bilinear and bicubic interpolation methods have been discussed many others could be utilized (e.g. nearest neighbor, etc.)

Referring back to FIGS. 1, 2, 3, and 8, once the target pixel value has been determined, at step (222) the target pixel value is set and is stored in transformation database 26. At step (224), it is finally determined whether the last column of the current row of target pixels has been reached. If not, then at step (226) the unit displacement vector as calculated by the display estimation module 16 is utilized to locate the position on scaled/transformed source image that corresponds to the adjacent target pixel. Then step (220) and those that follow it are executed again. If however, at step (224) it is determined that the last column of the current row has been reached then step (212) is executed as above.

Again, it should be understood that while the above-noted discussion has specifically discussed "row-wise" processing within the target image, image transformation system 10 could also operate in a "column-wise"manner to determine pixel values for the target image for display in target pixel array 25. That is, mapping module 20 could instead process rows of target image "column by column" starting with a first valid source position vector and a final valid source position vector for a first target column. Then all pixels in the current column could be filled with background color depending on the values of the first and final valid source position vectors. Finally, the points on the source image indicated by the valid source position vectors would be identified target row by target row within each target column. That is, the unit displacement vector would correspond to a single row displacement in the target image and be used to move to the next target row position within a column. Once the last row was reached within a target column, the next target column would be processed. On this basis, interpolation would be applied to obtain target pixel values for the target image on a "column by column" basis.

Figure 11:
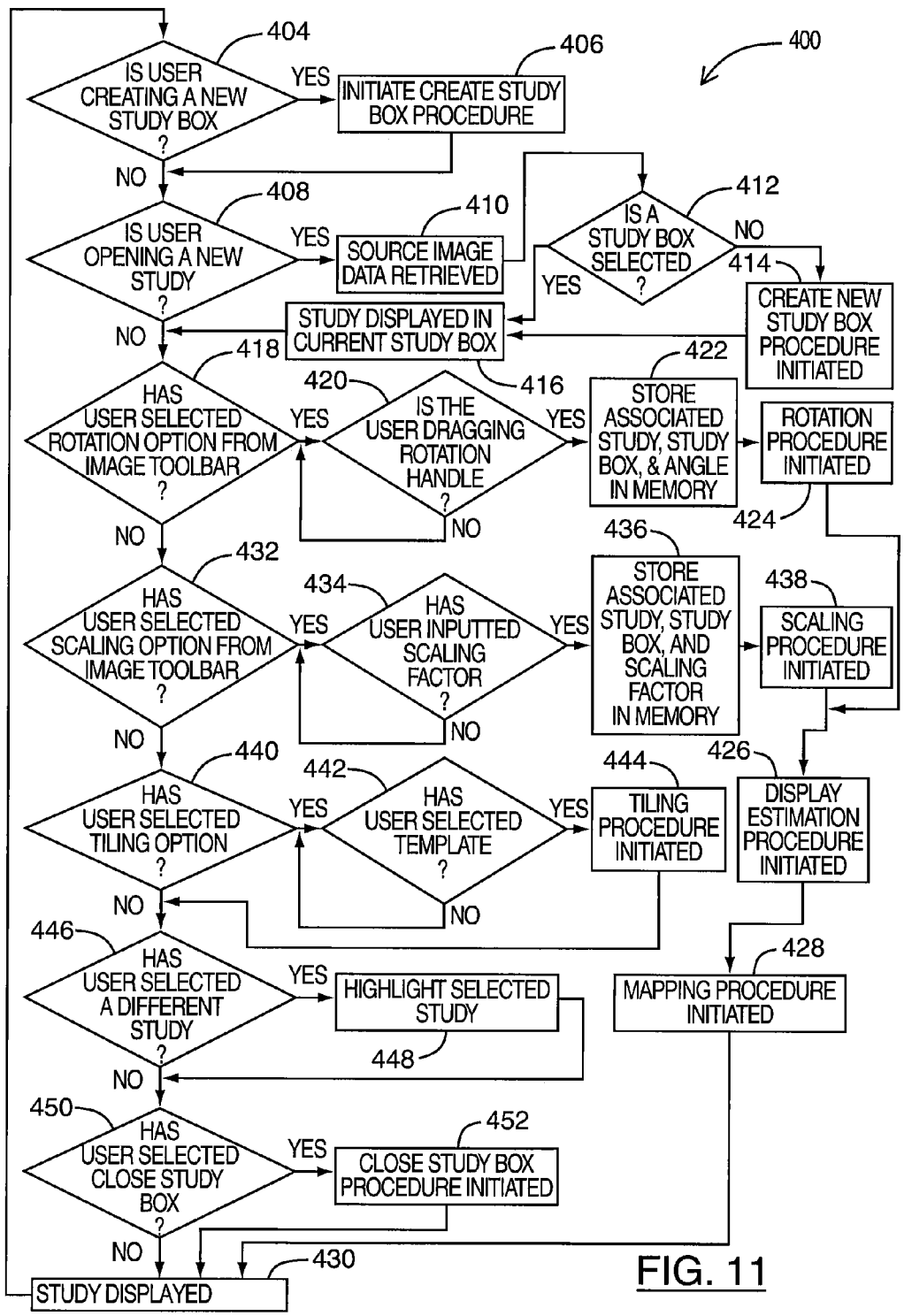
FIG. 11 is a flowchart illustrating the process steps conducted by the image transformation system of FIG. 1 in the context of a user's typical interaction.

Now referring to FIGS. 1, 2, 3 and 11, the specific workings of the image translation module 12 will be described in the context of a user's 11 typical interaction with overall image transformation system 10 discussed above. FIG. 11 is a flowchart illustrating a more detailed set of operational steps that are executed by image processing module 12. As can be seen, FIG. 11 is a more detailed version of FIG. 3. For example, step (79) of FIG. 3, altering display options, has been expanded to steps (404), (440), (446) and (450), which are creating a new study box 34, selecting tiling option, selecting a particular study 30 and closing study box 34 respectively.

At step (404) it is determined whether the user 11 has chosen the create study box option. If so then at step (406) the create study box procedure is initiated. Then step (408) is initiated. If however, at step (404), it is determined that the user 11 has not selected the option, then step (408) is executed without going through step (406).

At step (408) it is determined whether the user 11 is opening a new study 30. If so then at step (410) the image data is retrieved. Then at step (412) it is determined whether a study box 34 is currently selected. If not then at step (414) a new study box 34 is created and then step (416) is executed. If at step (412) it is found that a study box 34 has been selected then step (416) is executed immediately. At step (418) it is determined whether the user 11 selected the rotation option form the image toolbar 36. If so, then at step (420) it is determined whether user 11 is dragging the rotation handle 40. If not then the image processing module 12 continues to monitor whether user 11 has dragged the rotation handle 40. If so then at step (422) the associated study 30, study box 34 and rotation angle are stored in transformation database 26. Then at step (424) the image is rotated by the image transformation module 18. At step (426), the display estimation module 16 is initiated. At step (428) the mapping module 20 maps the original source image onto the target pixel array 25 within study box 34. Finally, at step (430) the study 30 is displayed on diagnostic display 23 and the image processing module 12 returns to step (404).

Returning to step (418), if it is determined that user 11 has not selected the rotation option then at step (432) it is determined whether user 11 has selected the scaling option from the image toolbar. If so then at step (434) it is determined whether user 11 has inputted a scaling factor. If not then the image processing module continues to monitor whether the user has inputted a scaling factor. If so, then at step (436) the selected study 30, study box 34, and scaling factor are inputted into memory. Then at step (438) scaling module is initiated which scales the source image. Then steps (426) through (430) are executed as described above.

Returning to step (432), if it is determined that user 11 has not selected the scaling option then at step (440) it is determined whether the user has selected the tiling option. The tiling option allows for the display of several study boxes on diagnostic display 23. At step (442) it is determined whether user 11 has selected an image template 37. If not then image processing module 12 continues to monitor whether user 11 has selected a template. If so, then at step (444) the tiling procedure is initiated. Finally, at step (430), the transformed study 30 is displayed on diagnostic display 23.

Returning to step (440), if user 11 has not selected the tiling option then at step (446) it is determined whether user 11 has selected a different study 30 than that currently selected. If so then at step (448), the newly selected image is highlighted. If not then at step (450) it is determined whether user 11 has selected the close study box option. If so then close study box procedure is initiated at step (452) and then step (430) is executed as described above. If not then display estimation module returns to step (404).

Figure 12:
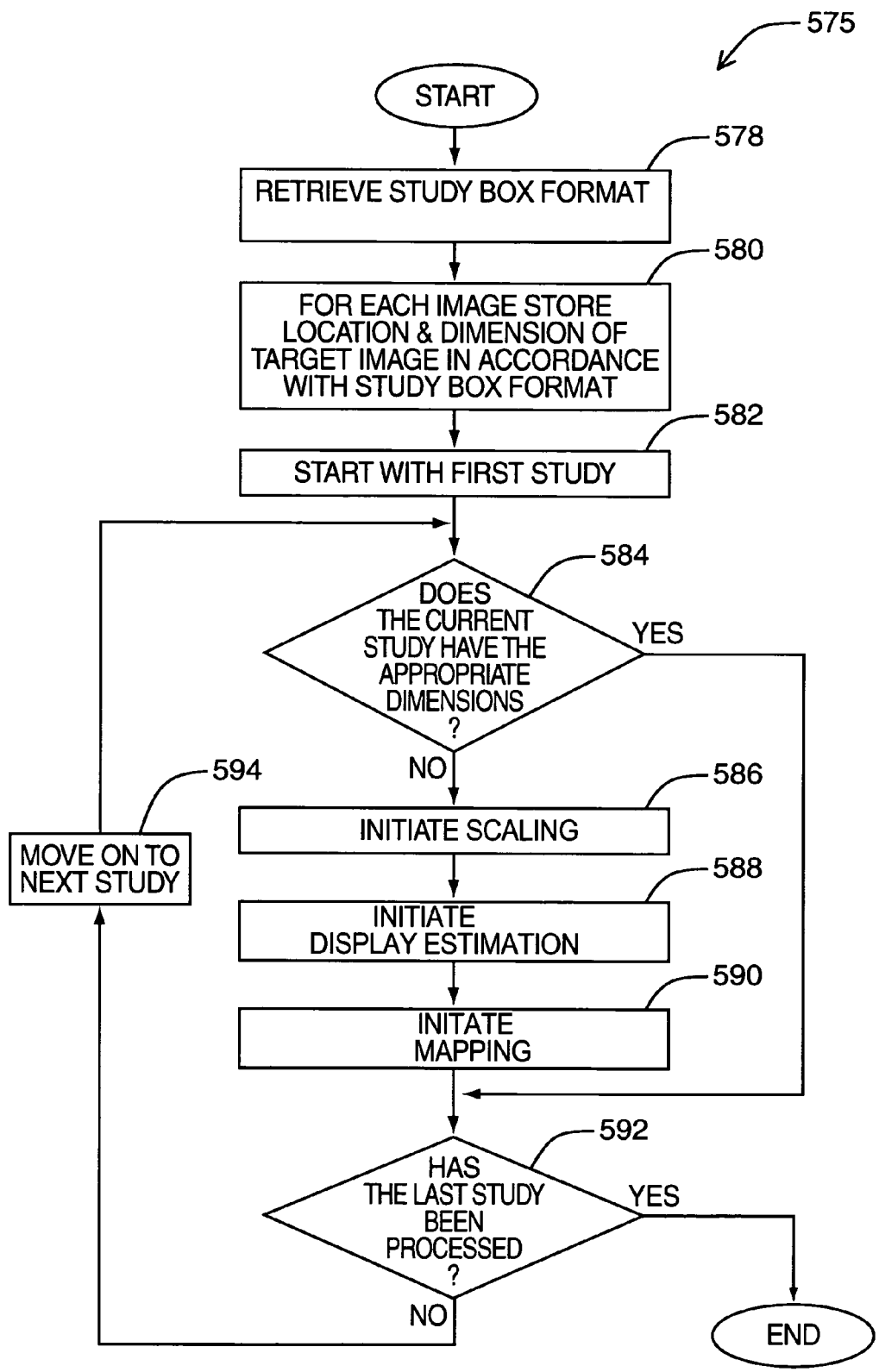
FIG. 12 is a flowchart illustrating the process steps of the image transformation system of FIG. 1 implemented within a typical study tiling system.

Reference is now made to FIG. 12 that illustrates image transformation system 10 implemented within a typical study tiling display. At step (578), a study box 34 format is retrieved from memory. At step (580) the required location and dimensions of each image according to the format is stored in transformation database 26. At step (582) the first study 30 is selected. At step (584) it is determined whether the current study 30 already has the appropriate dimensions. If not then at step (586) the scaling module is initiated for the current image. Then at step (588) the display estimation module is initiated. Then the mapping module is executed at step (590). Then at step (592) it is determined whether the last study has been processed. If so then the procedure is terminated. If not then at step (594) the next image is selected and step (584) and those following it are repeated. Returning to step (584), if it is determined that the current image is already of the appropriate dimensions then steps (586) through (590) are bypassed and step (592) is executed. At step (592) it is determined whether the final image has been processed.

Various alternatives to the preferred embodiment of the image transformation system are possible. For example, the system can easily be adapted to handle translations of images in addition to rotation and scaling. Thus, while certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. An image transformation system for transforming a source image having source image pixel data associated with a source pixel array having an origin into a target image having target image pixel data associated with a target pixel array according to an image transformation, said system comprising:
  (a) a memory for storing the source image pixel data and the image transformation;
  (b) a processor coupled to said memory for retrieving the source image pixel data and the image transformation;
  (c) said processor being further adapted to:
    (i) apply the image transformation to the source image pixel data to generate transformed image pixel data;
    (ii) compare the transformed image pixel data to the target pixel array and determine the portion of the transformed image pixel data that fits within the target pixel array;
    (iii) identify the portion of the source image pixel data that corresponds to the portion of the transformed image pixel data determined in (ii); and
    (iv) apply the image transformation to the portion of the source image pixel data determined in (iii) to generate the target image pixel data.

2. The image transformation system of claim 1, said processor being further adapted to:
  (v) resample the target image pixel data by applying an interpolation kernel to the source image pixel data within the source pixel array to determine a set of resampled pixel values for the target image.

3. The image transformation system of claim 2, wherein the target image contains a plurality of target columns arranged in a plurality of target rows, and wherein the source pixel array contains a plurality of valid source positions, each valid source position being defined as a position within the source image where the interpolation kernel when applied, includes pixels within the source pixel array, wherein said processor is further adapted to identify the portion of the source image pixel data that corresponds to the portion of the transformed image by:
  (A) calculating a unit displacement vector in the source pixel array that represents a single target column displacement along any of the target rows of the target pixel array in the source pixel array;
  (B) identifying source position vectors in the source image pixel array that correspond to the start of each target row within the target image; and
  (C) determining using the unit displacement vector from (A) and the source position vectors from (B), the range of target columns within each target row that correspond to valid source positions within the source image.

4. The image transformation system of claim 3, wherein the set of valid source pixels for a target row within the target image are contiguous and wherein the range of target columns within each target row that correspond to valid source positions is determined as a continuous range for an entire row instead of on a per-target pixel by target pixel basis.

5. The image transformation system of claim 3, wherein the unit displacement vector and the source position vectors are fixed point vectors having an integer vector portion and a fractional vector portion and wherein at least one of:
  A) the difference between the integer and fractional vector portions of the target and the source position vectors is used to determine the set of coefficients for the interpolation kernel; and
  B) the interpolation kernel has a set of coefficients, wherein each target pixel corresponds to a target position vector within the source pixel array and is associated with a source position vector within the source pixel array, and wherein the fractional portion of the target position vector in respect of the source position vector represents the offset from at least one source pixel and is used to determine the set of coefficients for the interpolation kernel.

6. The image transformation system of claim 5, wherein said processor is further adapted to calculate pixel values for the target image by applying at least one of:
  A) bicubic interpolation using sixteen source pixels that surround a target position, wherein the pixel values of the sixteen source pixels are represented by $P_{00}, P_{01}, P_{02}$, and $P_{03}, P_{10}, P_{11}, P_{12}, P_{13}, P_{20}, P_{21}, P_{22}, P_{23}, P_{30}, P_{31}, P_{32}$, and $P_{33}$, and wherein $P_{00}$ is closer to the origin of the source pixel array than $P_{01}, P_{02}$, and $P_{03}, P_{10}, P_{11}, P_{12}, P_{13}, P_{20}, P_{21}, P_{22}, P_{23}, P_{30}, P_{31}, P_{32}$, and $P_{33}$, and wherein the fractional vector portion of the target position vector is represented by $(x_f, y_f)$ relative to $P_{00}$, such that the pixel value of the corresponding target pixel is given by:

$$P_t = K_0[y_f](K_0[x_f]P_{00} + K_1[x_f]P_{01} + K_2[x_f]P_{02} + K_3[x_f]P_{03}) + K_1[y_f](K_0[x_f]P_{10} + K_1[x_f]P_{11} + K_2[x_f]P_{12} + K_3[x_f]P_{13}) + K_2[y_f](K_0[x_f]P_{20} + K_1[x_f]P_{21} + K_2[x_f]P_{22} + K_3[x_f]P_{23}) + K_3[y_f](K_0[x_f]P_{30} + K_1[x_f]P_{31} + K_2[x_f]P_{32} + K_3[x_f]P_{33});$$

where the subscript n in $K_n[\ ]$ represents the index of each of the four nearest source pixel positions and where the $K_n[\ ]$ values are determined through application of a bicubic kernel; and B) bilinear interpolation using four source pixels that surround a target position, wherein the pixel values of the four source pixels are represented by $P_{00}$, $P_{01}$, $P_{10}$, and $P_{11}$ where $P_{00}$ is closer to the origin of the source pixel array than $P_{01}$, $P_{10}$, and $P_{11}$, and wherein the fractional vector portion of the target position vector is represented by $(x_f, y_f)$ relative to $P_{00}$, such that the pixel value of the corresponding target pixel is given by: $P_t = (1-y_f)[(1-x_f)P_{00} + x_f P_{01}] + (y_f)[(1-x_f)P_{10} + (x_f)P_{11}]$.

7. The image transformation system of 6, wherein the bicubic kernel is:

$$h(x) = \begin{cases} (a+2)|x|^3 - (a+3)|x|^2 + 1 \ldots 0 \le |x| < 1 \\ a|x|^3 - 5a|x|^2 + 8a|x| - 4a \ldots 1 \le |x| < 2 \\ 0 \ldots 2 \le |x| \end{cases}$$

where a is any value in the range of 0 to −1.

8. The image transformation system of 1, wherein at least one of:
   A) the dimensions of the target pixel array are determined prior to application of the image transformation to the source image data;
   B) the source image is transformed into the transformed image through at least one of rotation, scaling, translation;
   C) the source image is transformed into the target image through an affine transformation;
   D) the target pixel array is implemented within a physical display; and
   E) the target pixel array is implemented within memory.

9. A method of transforming a source image having source image pixel data associated with a source pixel array having an origin into a target image having target image pixel data associated with a target pixel array according to an image transformation, said method comprising:
   (a) storing the source image pixel data and the image transformation;
   (b) retrieving the source image pixel data and the image transformation;
   (c) applying the image transformation to the source image pixel data to generate transformed image pixel data;
   (d) comparing the transformed image pixel data to the target pixel array and determine the portion of the transformed image pixel data that fits within the target pixel array;
   (e) identifying the portion of the source image pixel data that corresponds to the portion of the transformed image pixel data determined in (d); and
   (f) applying the image transformation to the portion of the source image pixel data determined in (e) to generate the target image pixel data.

10. The image transformation method of claim 9, further comprising:
   (g) resampling the target image pixel data by applying an interpolation kernel to the source image pixel data within the source pixel array to determine a set of resampled pixel values for the target image.

11. The image transformation method of claim 10, wherein the target image contains a plurality of target columns arranged in a plurality of target rows, and wherein the source pixel array contains a plurality of valid source positions, each valid source position being defined as a position within the source image where the interpolation kernel when applied, includes pixels within the source pixel array, wherein the portion of the source image pixel data that corresponds to the portion of the transformed image is identified by:
   (A) calculating a unit displacement vector in the source pixel array that represents a single target column displacement along any of the target rows of the target pixel array in the source pixel array;
   (B) identifying source position vectors in the source image pixel array that correspond to the start of each target row within the target image; and
   (C) determining using the unit displacement vector from (A) and the source position vectors from (B), the range of target columns within each target row that correspond to valid source positions within the source image.

12. The image transformation method of claim 11, wherein the set of valid source pixels for a target row within the target image are contiguous and wherein the range of target columns within each target row that correspond to valid source positions is determined as a continuous range for an entire row instead of on a per-target pixel by target pixel basis.

13. The image transformation method of claim 11, wherein the unit displacement vector and the source position vectors are fixed point vectors having an integer vector portion and a fractional vector portion and wherein at least one of:
   A) the difference between the integer and fractional vector portions of the target and the source position vectors is used to determine the set of coefficients for the interpolation kernel; and
   B) the interpolation kernel has a set of coefficients, wherein each target pixel corresponds to a target position vector within the source pixel array and is associated with a source position vector within the source pixel array, and wherein the fractional portion of the target position vector in respect of the source position vector represents the offset from at least one source pixel and is used to determine the set of coefficients for the interpolation kernel.

14. The image transformation method of claim 13, wherein said processor is further adapted to calculate pixel values for the target image by applying at least one of:
   A) bicubic interpolation using sixteen source pixels that surround a target position, wherein the pixel values of the sixteen source pixels are represented by $P_{00}$, $P_{01}$, $P_{02}$, and $P_{03}$, $P_{10}$, $P_{11}$, $P_{12}$, $P_{13}$, $P_{20}$, $P_{21}$, $P_{22}$, $P_{23}$, $P_{30}$, $P_{31}$, $P_{32}$, and $P_{33}$, and wherein $P_{00}$ is closer to the origin of the source pixel array than $P_{01}$, $P_{02}$, and $P_{03}$, $P_{10}$, $P_{11}$, $P_{12}$, $P_{13}$, $P_{20}$, $P_{21}$, $P_{22}$, $P_{23}$, $P_{30}$, $P_{31}$, $P_{32}$, and $P_{33}$, and wherein the fractional vector portion of the target position vector is represented by $(x_f, y_f)$ relative to $P_{00}$, such that the pixel value of the corresponding target pixel is given by:

$P_t = K_0[y_f](K_0[x_f]P_{00} + K_1[x_f]P_{01} + K_2[x_f]P_{02} + K_3[x_f]P_{03}) + K_1[y_f](K_0[x_f]P_{10} + K_1[x_f]P_{11} + K_2[x_f]P_{12} + K_3[x_f]P_{13}) + K_2[y_f](K_0[x_f]P_{20} + K_1[x_f]P_{21} + K_2[x_f]P_{22} + K_3[x_f]P_{23}) + K_3[y_f](K_0[x_f]P_{30} + K_1[x_f]P_{31} + K_2[x_f]P_{32} + K_3[x_f]P_{33});$ where the subscript n in $K_n[\ ]$ represents the index of each of the four nearest source pixel positions and where the $K_n[\ ]$ values are determined through application of a bicubic kernel; and B) bilinear interpolation using four source pixels that surround a target position, wherein the pixel values of the four source pixels are represented by $P_{00}$, $P_{01}$, $P_{10}$, and $P_{11}$ where $P_{00}$ is closer to the origin of the source pixel array than $P_{01}$, $P_{10}$, and $P_{11}$, and wherein the fractional vector portion of the target position vector is represented by the $(x_f, y_f)$ relative to $P_{00}$, such that the pixel value of the corresponding target pixel is given by: $P_t = (1-y_F)[(1-x_f)P_{00}+x_f P_{01}]+(y_F)[(1-x_f)P_{10}+(x_f)P_{11}]$.

15. The image transformation method of 14, wherein the bicubic kernel is:

$$h(x) = \begin{cases} (a+2)|x|^3 - (a+3)|x|^2 + 1 \ldots 0 \leq |x| < 1 \\ a|x|^3 - 5a|x|^2 + 8a|x| - 4a \ldots 1 \leq |x| < 2 \\ 0 \ldots 2 \leq |x| \end{cases}$$

where a is any value in the range of 0 to −1.

16. The image transformation method of 17, wherein at least one of:
A) the dimensions of the target pixel array are determined prior to application of the image transformation to the source image data;
B) the source image is transformed into the transformed image through at least one of rotation, scaling, translation;
C) the source image is transformed into the target image through an affine transformation;
D) the target pixel array is implemented within a physical display; and
E) the target pixel array is implemented within memory.

17. An image transformation system for transforming a source image having source image pixel data associated with a source pixel array having an origin into a target image having target image pixel data associated with a target pixel array according to an image transformation, wherein said target image contains a plurality of target columns arranged in a plurality of target rows, said system comprising:
(a) a memory for storing the source image pixel data and the image transformation;
(b) a processor coupled to said memory for retrieving the source image pixel data and the image transformation;
(c) said processor being further adapted to:
(i) apply the image transformation to the source image pixel data to generate the target image pixel data;
(ii) resample the target image pixel data by calculating pixel values for the target image using an interpolation kernel having a set of coefficients, wherein for each target pixel within a row of the target image:
(I) determine a target position vector and a corresponding target position within the source pixel array;
(II) determine the corresponding source position vector within the source pixel array;
(III) determine a remainder portion for the target position vector in respect of the source position vector; and
(V) utilize the remainder portion from (III) to determine the set of coefficients for the interpolation kernel.

18. The image transformation system of claim 17, wherein the source position vector and the target position vector are fixed point vectors containing an integer vector portion and a fractional vector portion.

19. The image transformation system of claim 18, wherein said processor is further adapted to calculate pixel values for the target image by applying at least one of:
A) bicubic interpolation using sixteen source pixels that surround a target position, wherein the pixel values of the sixteen source pixels are represented by $P_{00}$, $P_{01}$, $P_{02}$, and $P_{03}$, $P_{10}$, $P_{11}$, $P_{12}$, $P_{13}$, $P_{20}$, $P_{21}$, $P_{22}$, $P_{23}$, $P_{30}$, $P_{31}$, $P_{32}$, and $P_{33}$, and wherein $P_{00}$ is closer to the origin of the source pixel array than $P_{01}$, $P_{02}$, and $P_{03}$, $P_{10}$, $P_{11}$, $P_{12}$, $P_{13}$, $P_{20}$, $P_{21}$, $P_{22}$, $P_{23}$, $P_{30}$, $P_{31}$, $P_{32}$, and $P_{33}$, and wherein the fractional vector portion of the target position vector is represented by $(x_f, y_f)$ relative to $P_{00}$, such that the pixel value of the corresponding target pixel is given by:

$P_t = K_0[y_f](K_0[x_f]P_{00}+K_1[x_f]P_{01}+K_2[x_f]P_{02}+K_3[x_f]P_{03})+K_1[y_f](K_0[x_f]P_{10}+K_1[x_f]P_{11}+K_2[x_f]P_{12}+K_3[x_f]P_{13})+K_2[y_f](K_0[x_f]P_{20}+K_1[x_f]P_{21}+K_2[x_f]P_{22}+K_3[x_f]P_{23})+K_3[y_f](K_0[x_f]P_{30}+K_1[x_f]P_{31}+K_2[x_f]P_{32}+K_3[x_f]P_{33})$;

where the subscript n in $K_n[\ ]$ represents the index of each of the four nearest source pixel positions and where the $K_n[\ ]$ values are determined through application of a bicubic kernel; and
B) bilinear interpolation using four source pixels that surround a target position, wherein the pixel values of the four source pixels are represented by $P_{00}$, $P_{01}$, $P_{10}$, and $P_{11}$ where $P_{00}$ is closer to the origin of the source pixel array than $P_{01}$, $P_{10}$, and $P_{11}$, and wherein the fractional vector portion of the target position vector is represented by the $(x_f, y_f)$ relative to $P_{00}$, such that the pixel value of the corresponding target pixel is given by: $P_t = (1-y_F)[(1-x_f)P_{00}+x_f P_{01}]+(y_F)[(1-x_f)P_{10}+(x_f)_{11}]$.

20. The image transformation system of claim 19, wherein the bicubic kernel is:

$$h(x) = \begin{cases} (a+2)|x|^3 - (a+3)|x|^2 + 1 \ldots 0 \leq |x| < 1 \\ a|x|^3 - 5a|x|^2 + 8a|x| - 4a \ldots 1 \leq |x| < 2 \\ 0 \ldots 2 \leq |x| \end{cases}$$

where a is any value in the range of 0 to −1.

21. The image transformation system of claim 18, wherein the difference between the integer and fractional vector portions of the target and the source position vectors is used to determine the set of coefficients for the interpolation kernel.

22. A method for transforming a source image having source image pixel data associated with a source pixel array having an origin into a target image having target image pixel data associated with a target pixel array according to an image transformation, wherein said target image contains a plurality of target columns arranged in a plurality of target rows, said method comprising:
(a) storing the source image pixel data and the image transformation;
(b) retrieving the source image pixel data and the image transformation;
(c) applying the image transformation to the source image pixel data to generate the target image pixel data;
(d) resampling the target image pixel data by calculating pixel values for the target image using an interpolation kernel having a set of coefficients, wherein for each target pixel within a row of the target image:
(e) determining a target position vector and a corresponding target position within the source pixel array;
(f) determining the corresponding source position vector within the source pixel array;
(g) determining a remainder portion for the target position vector in respect of the source position vector; and
(h) utilizing the remainder portion from (g) to determine the set of coefficients for the interpolation kernel.

23. The image transformation method of claim 22, wherein the source position vector and the target position vector are fixed point vectors containing an integer vector portion and a fractional vector portion.

24. The image transformation method of claim 23, wherein the difference between the integer and fractional vector portions of the target and the source position vectors is used to determine the set of coefficients for the interpolation kernel.

25. The image transformation method of claim 23, wherein said processor is further adapted to calculate pixel values for the target image by applying at least one of:

A) bicubic interpolation using sixteen source pixels that surround a target position, wherein the pixel values of the sixteen source pixels are represented by $P_{00}$, $P_{01}$, $P_{02}$, and $P_{03}$, $P_{10}$, $P_{11}$, $P_{12}$, $P_{13}$, $P_{20}$, $P_{21}$, $P_{22}$, $P_{23}$, $P_{30}$, $P_{31}$, $P_{32}$, and $P_{33}$, and wherein $P_{00}$ is closer to the origin of the source pixel array than $P_{01}$, $P_{02}$, and $P_{03}$, $P_{10}$, $P_{11}$, $P_{12}$, $P_{13}$, $P_{20}$, $P_{21}$, $P_{22}$, $P_{23}$, $P_{30}$, $P_{31}$, $P_{32}$, and $P_{33}$, and wherein the fractional vector portion of the target position vector is represented by $(x_f, y_f)$ relative to $P_{00}$, such that the pixel value of the corresponding target pixel is given by:

$$P_t = K_0[y_f](K_0[x_f]P_{00} + K_1[x_f]P_{01} + K_2[x_f]P_{02} + K_3[x_f]P_{03}) + K_1[y_f](K_0[x_f]P_{10} + K_1[x_f]P_{11} + K_2[x_f]P_{12} + K_3[x_f]P_{13}) + K_2[y_f](K_0[x_f]P_{20} + K_1[x_f]P_{21} + K_2[x_f]P_{22} + K_3[x_f]P_{23}) + K_3[y_f](K_0[x_f]P_{30} + K_1[x_f]P_{31} + K_2[x_f]P_{32} + K_3[x_f]P_{33});$$

where the subscript n in $K_n[\ ]$ represents the index of each of the four nearest source pixel positions and where the $K_n[\ ]$ values are determined through application of a bicubic kernel; and B) bilinear interpolation using four source pixels that surround a target position, wherein the pixel values of the four source pixels are represented by $P_{00}$, $P_{01}$, $P_{10}$, and $P_{11}$ where $P_{00}$ is closer to the origin of the source pixel array than $P_{01}$, $P_{10}$, and $P_{11}$, and wherein the fractional vector portion of the target position vector is represented by the $(x_f, y_f)$ relative to $P_{00}$, such that the pixel value of the corresponding target pixel is given by: $P_t = (1-y_F)[(1-x_f)P_{00} + x_f P_{01}] + (y_F)[(1-x_f)P_{10} + (x_f)P_{11}]$.

* * * * *